(12) United States Patent
Lyons

(10) Patent No.: US 7,609,207 B2
(45) Date of Patent: Oct. 27, 2009

(54) SYSTEM AND METHOD FOR PERFORMING TIME DIFFERENCE OF ARRIVAL LOCATION WITHOUT REQUIRING A COMMON TIME BASE OR CLOCK CALIBRATION

(75) Inventor: Daniel Lyons, Chippewa, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/345,706

(22) Filed: Dec. 30, 2008

(65) Prior Publication Data

US 2009/0109094 A1 Apr. 30, 2009

Related U.S. Application Data

(63) Continuation of application No. 11/367,144, filed on Mar. 3, 2006, now Pat. No. 7,477,191.

(51) Int. Cl.
*G01S 1/24* (2006.01)
*G01S 3/02* (2006.01)

(52) U.S. Cl. ..................... 342/387; 342/465

(58) Field of Classification Search ............ 342/387, 342/465
See application file for complete search history.

(56) References Cited

U.S. PATENT DOCUMENTS 6,603,978 B1* 8/2003 Carlsson et al. ............ 455/502

2005/0280578 A1* 12/2005 Boyd ........................ 342/465
2007/0205944 A1* 9/2007 Lyons ....................... 342/387

OTHER PUBLICATIONS

International Search Report dated Dec. 9, 2008 for International Application No. PCT/US07/62316.
Written Opinion dated Dec. 9, 2008 for International Application No. PCT/US07/62316.

* cited by examiner

*Primary Examiner*—Thomas H Tarcza
*Assistant Examiner*—Harry Liu
(74) *Attorney, Agent, or Firm*—Tucker Ellis & West LLP

(57) ABSTRACT

A method for performing Time Difference Of Arrival (TDOA) that eliminates the need for a common time base or clock calibration and a system for implementing the method. The method relies on a packet transmitted from a reference wireless device (first wireless device) with a known propagation delay between the first wireless device and a second device, which serves as a common reference point for all TDOA estimates. When a packet is received from a wireless device by the first wireless device and the second wireless device, the time difference of arrival is computed based on when the signal was received by the first device and the second device, using the known propagation delay to compensate for differences in clocks and frequencies between the first wireless device and the second wireless device.

19 Claims, 3 Drawing Sheets

SYSTEM AND METHOD FOR PERFORMING TIME DIFFERENCE OF ARRIVAL LOCATION WITHOUT REQUIRING A COMMON TIME BASE OR CLOCK CALIBRATION

CROSS-REFERENCE TO RELATED APPLICATIONS

This application is a continuation of U.S. application Ser. No. 11/367,144, filed on Mar. 3, 2006 now U.S. Pat. No. 7,477,191.

BACKGROUND OF THE INVENTION

The present invention relates generally to a system and method for performing Time Difference Of Arrival (TDOA) and more specifically to a system and method for performing TDOA without requiring a common time base or clock calibration.

Time Difference Of Arrival (TDOA) refers to determining the position of a wireless transceiver (e.g. radio) by transmitting a signal from the wireless transceiver and then estimating the signal arrival time at multiple reference receivers, for example access points 'APs' in a Wireless Local Area Network (WLAN) system with known positions. The TDOA algorithm then compares the relative arrival time of the signal at the various APs to determine the radio's location. If the various APs do not share a common time base, clock calibration is required to determine the relative difference between the time bases of the APs. Performing clock calibration in practice is problematic for several reasons. First, it consumes time that could be used for data transmission. Second, the clock frequencies of the various APs will vary with time and therefore require periodic recalibration. Third, any inaccuracy in the clock frequency calibration will result in location estimation error.

BRIEF SUMMARY OF THE INVENTION

In accordance with an aspect of the present invention, there is disclosed herein a TDOA implementation that eliminates the need for clock calibration and therefore also eliminates the problems associated with performing clock calibration. The implementation includes a method and an apparatus configured to implement the method. The method relies on a packet transmitted from a reference wireless device with a known propagation delay, which serves as a common reference point for all TDOA estimates.

In accordance with an aspect of the present invention, there is described herein a method for determining a time difference of arrival from a signal sent by a third wireless device that is received by a first wireless device and a second wireless device. The method assumes that a signal was also received by the second wireless device from the first wireless device and that the propagation delay between the first wireless device and the second wireless device is known. The method comprises determining a first difference, the first difference being the difference between when a packet transmitted by a first wireless device was received by a second wireless device. The method further comprises determining a second difference, the second difference being the difference between when a packet transmitted by a first wireless device was received and when a packet from a third wireless device was received by the second wireless device. The method also comprises determining the relative frequency difference between the first wireless device and the second wireless device. The method still further comprises determining a product, the product being the product of the relative frequency difference and the second difference. The method still further comprises determining a time difference of arrival from the difference between the first difference and the product. Aspects of the present invention further comprise an apparatus for implementing methodologies of the present invention.

Still other objects of the present invention will become readily apparent to those skilled in this art from the following description wherein there is shown and described a preferred embodiment of this invention, simply by way of illustration of at least one of the best modes best suited to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

DETAILED DESCRIPTION OF INVENTION

Throughout this description, the preferred embodiment and examples shown should be considered as exemplars, rather than limitations, of the present invention. An aspect of the present invention is for a method for performing Time Difference Of Arrival (TDOA) that eliminates the need for a common time base or clock calibration. The method relies on receiving a packet transmitted from a reference wireless receiver with a known propagation delay, which serves as a common reference point for TDOA estimates.

Figure 1:
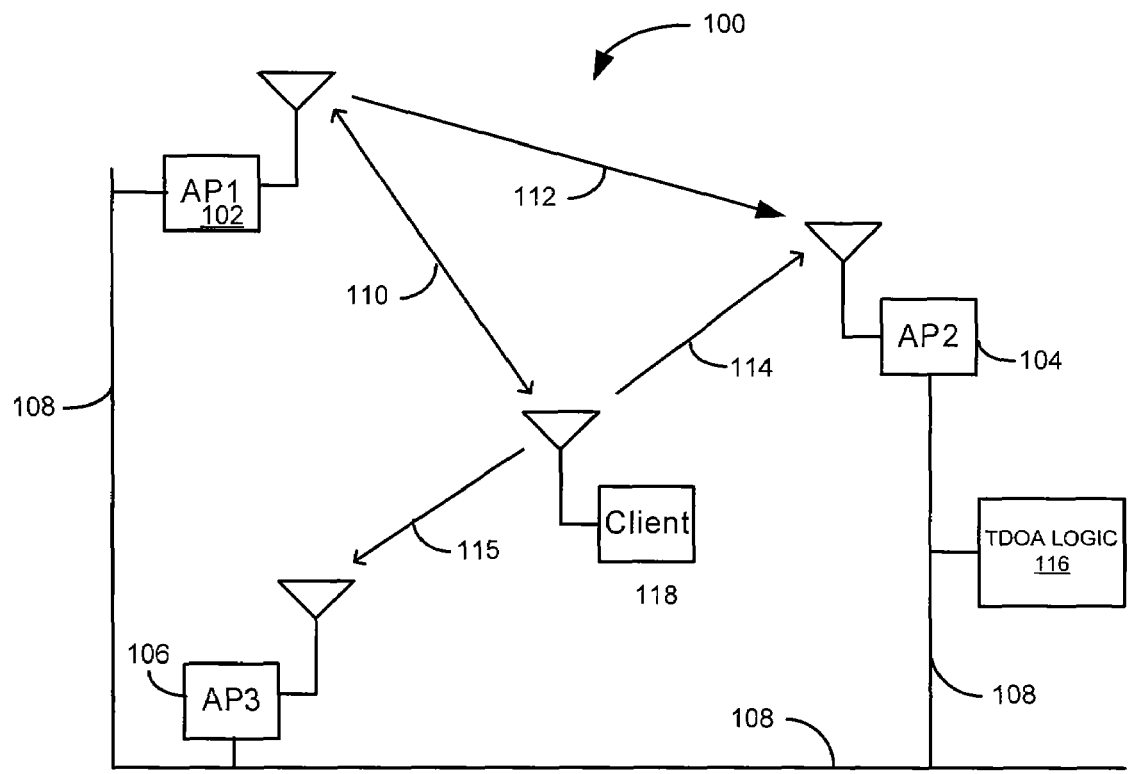
FIG. 1 is a block diagram of a network configured for computing time difference of arrival in accordance with an aspect of the present invention.

Referring to FIG. 1, there is illustrated a network 100 for implementing TDOA. The network comprises three access points (APs) AP1 102, AP2 104 and AP3 106 that can be employed to triangulate the position of client 118. AP1 102, AP2 104 and AP3 106 are coupled by a distribution network 108. Distribution network 108 may suitably comprise a wired segment, wireless segment or a combination of wired and wireless segments. Distribution network 108 may suitably comprise other network devices including but not limited to additional access points, an authentication authorization and accounting (AAA) server, a wireless domain server (WDS), or other computing devices (not shown). Coupled to network 108 is TDOA Logic 116. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software. TDOA Logic 116 is configured to compute TDOA based on signals received by at least two of AP1 102, AP2 106 and AP3 106. Although TDOA logic 116 is illustrated as being a standalone network component, it is also contemplated in alternative embodiments that TDOA logic can be co-located with any network component, for example AP2 104 and/or AP3 106.

Client 118 is illustrated as being in two-way communication with AP1 102 via path 110. AP2 106 and AP3 106 also can receive signals from client 118 as illustrated by 114 and 115 respectively. Furthermore, AP2 106 can receive signals from AP1 102 as illustrated by path 112. In the example used herein, the TDOA method is described using two APs, e.g. AP1 102 and AP2 104. The use of two APs for describing the method is for ease of illustration and those skilled in the art should readily appreciate that aspects of the present invention are suitable for any number of additional APs or wireless devices capable of receiving a wireless signal from a reference AP (e.g. AP1 102) and client 118.

An example of a method in accordance with an aspect of the present invention will be now be described with reference to FIG. 1. For example, AP1 102 transmits a packet to the client to be located (i.e. client 118). Client 118 transmits a packet in response. It is assumed that AP2 104 and AP3 106 (or any other AP used to calculate TDOA for client 118) knows the propagation delay between itself and AP1 102, has some time base that it uses to report TDOA, knows the time of arrival (TOA) of the packet from AP1 102 and knows the TOA of the packet from client 118.

In prior art systems, unless the APs (AP1 102, AP2 104 and AP3 106) share a common time base or calibration information is available to "align" the time bases of the APs, TOA estimates cannot be directly compared between APs. However, in accordance with an aspect of the present invention, because AP2 104 (and/or AP3) knows the propagation delay between itself and AP1 102 and knows the time of arrival of the packet from AP1 102, each AP can determine the time of departure (TOD) for the packet sent by AP1 102, which provides a common reference point. By subtracting the TOD of the packet from AP1 102 from the TOA of the packet sent from client 118, a TOA estimate that is relative to the same reference point can be obtained and thus TOA estimates can be directly compared between APs.

The propagation delay between each of the APs can either be estimated (e.g. the location of the AP is known) or can be predetermined by measuring the distance between APs or can be calculated dynamically, see e.g. U.S. Patent Application 2004/0203877 to Golden, hereby incorporated by reference, for a method of calculating propagation delay. It should also be appreciated that it is not necessary that AP1 102 transmits a packet prior to the packet sent by client 118. For example, radio tags transmit periodically rather than in response to an AP, AP1 102 could transmit immediately after it observes a client packet. In a preferred embodiment, each AP used by the TDOA algorithm is able to receive signals from both AP1 102 and client 118.

Figure 2:
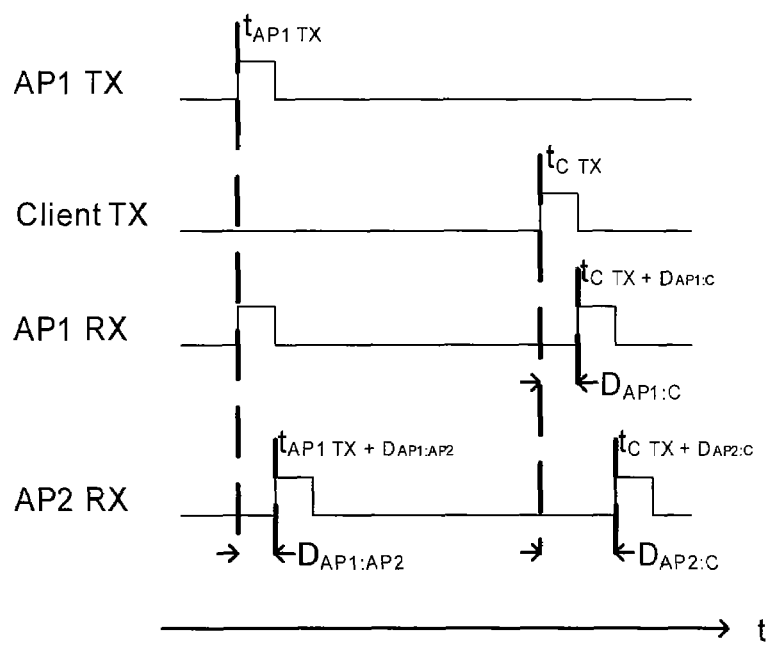
FIG. 2 is a timing diagram for computing time difference of arrival.

Referring to FIG. 2, with continued reference to FIG. 1, there is illustrated a timing diagram indicating how the TDOA for client 118 is computed between AP1 102 and AP2 104. In FIG. 2, $t_{AP1\ TX}$ is the start of packet time for the packet transmitted from AP1 102, $t_{C\ TX}$ is the start of packet time for the packet transmitted from the client, $t_{AP1\ TX+D_{AP1:AP2}}$ is the time when the packet from AP1 102 arrives at AP2 104, $t_{C\ TX+D_{AP1:C}}$ is the time when the packet from the client arrives at AP1 102, $t_{C\ TX+D_{AP2:C}}$ is the time when the packet from the client arrives at AP2 104, $D_{AP1:AP2}$ is the propagation delay between AP1 102 and AP2 104, $D_{AP1:C}$ is the propagation delay between AP1 102 and the client 118, and $D_{AP2:C}$ is the propagation delay between AP2 104 and the client 118. An aspect of the present invention is to determine the TDOA ($D_{AP1:C} - D_{AP2:C}$) between AP1 102 and AP2 104.

Figure 3:
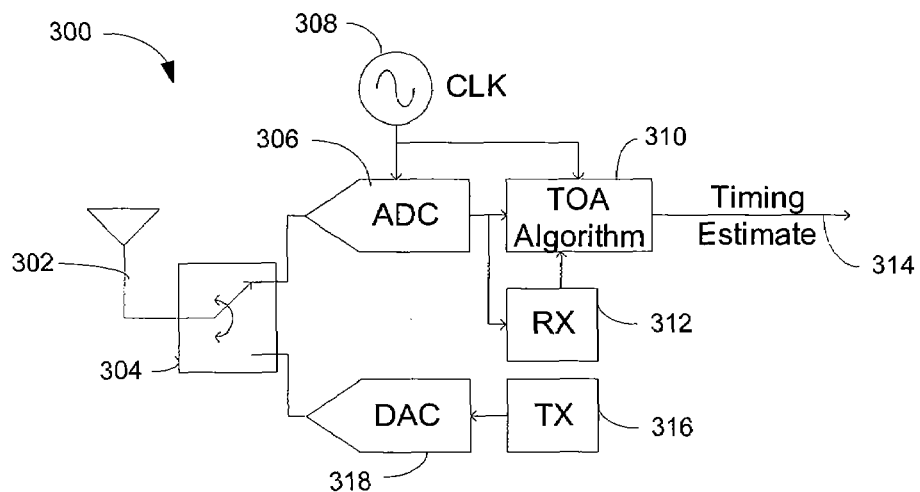
FIG. 3 is a block diagram of a wireless transceiver configured to determine time of arrival of signal.

If both APs (AP1 102 and AP2 104) share a common time base, determining the TDOA is as simple as subtracting $t_{C\ TX+D_{AP2:C}}$ from $t_{C\ TX+D_{AP1:C}}$. In a typical WLAN system, however, each AP has its own time base derived from its own reference clock. A simplified schematic of an AP 300 is shown in FIG. 3. AP 300 is suitable adapted to be employed as AP1 102 (FIG. 1), AP 104 (FIG. 1) and AP 106 (FIG. 1).

AP 300 sends and receives wireless signals via antenna 302. Switch 304 switches to couple either the transmit circuit or the receive circuit to antenna 302. As illustrated, transmit circuit comprises transmit buffer 316 and a digital to analog converter (DAC) 318. Transmit circuit further comprises any other circuitry (not shown) desired for amplification, encoding, modulation and frequency conversion, which are not essential for explaining aspects the present invention. The receive circuit comprises an analog to digital converter (ADC) 306, a clock (CLK) 308 coupled to ADC 308 and a Time of Arrival (TOA) Algorithm 310 coupled to ADC 306 and CLK 308 for determining a TOA for a packet received via antenna 302. TOA algorithm outputs a signal 314 indicative of a timing estimate of the TOA. In addition, receiver circuit further comprises a receive (RX) buffer 312 and any other circuitry (not shown) desired for amplification, decoding, demodulating and frequency conversion, which are not essential for explaining aspects of the present invention.

In operation, when a signal is received via antenna 302, switch 304 routes the packet to ADC 306, which converts the signal from an analog signal to a digital signal. The digital signal is processed by TOA algorithm 310 employing CLK 308 to determine a TOA for the signal.

Referring to FIG. 3, with continued reference to FIGS. 2 and 1, an AP 300 has a time base related to "absolute" time by:

$$t^{CLK} = (t - t_{CLK\ ON})\left(1 + \frac{f_{CLK} - f_{nom}}{f_{nom}}\right) \quad \text{Equation 1}$$

where $t^{CLK}$ denotes time as perceived by AP 300, t denotes absolute time, $t_{CLK\ ON}$ denotes the absolute time at which the clock and timer of the AP 300 were powered on and thus the timer started tracking time, $f_{CLK}$ is the clock frequency, and $f_{nom}$ denotes the nominal (or expected) clock frequency.

From AP1 102, we have time estimates of when the packet from AP1 102 was transmitted ($t_{AP1\ TX}^{CLK1}$) and when the client packet was received ($t_{CTX+D_{AP1:C}}^{CLK1}$) by AP2 104. Using Equation 1, $$t_{AP1TX}^{CLK1} = (t_{AP1TX} - t_{CLK1ON})\left(1 + \frac{f_{CLK1} - f_{nom}}{f_{nom}}\right) \quad \text{Equation 2}$$

and $$t_{CTX+D_{AP1:C}}^{CLK1} = (t_{CTX} + D_{AP1:C} - t_{CLK1ON})\left(1 + \frac{f_{CLK1} - f_{nom}}{f_{nom}}\right). \quad \text{Equation 3}$$

Subtracting Equation 2 from Equation 3 gives $$(t_{CTX} + D_{AP1:C} - t_{AP1TX})\left(1 + \frac{f_{CLK1} - f_{nom}}{f_{nom}}\right). \quad \text{Equation 4}$$

From AP2 104, we have time estimates of when the packet from AP1 102 was received ($t_{AP1\ TX+D_{AP1:AP2}}^{CLK2}$) and when the client 118 packet was received ($t_{C\ TX+D_{AP2:C}}^{CLK2}$). Using Equation 1, $$t_{AP1TX+D_{AP1:AP2}}^{CLK2} = \quad \text{Equation 5}$$
$$(t_{AP1TX} + D_{AP1:AP2} - t_{CLK2ON})\left(1 + \frac{f_{CLK2} - f_{nom}}{f_{nom}}\right)$$

and $$t_{CTX+D_{AP2:C}}^{CLK2} = (t_{CTX} + D_{AP2:C} - t_{CLK2ON})\left(1 + \frac{f_{CLK2} - f_{nom}}{f_{nom}}\right). \quad \text{Equation 6}$$

Subtracting Equation 5 from Equation 6 gives $$(t_{CTX} + D_{AP2:C} - t_{AP1TX} - D_{AP1:AP2})\left(1 + \frac{f_{CLK2} - f_{nom}}{f_{nom}}\right). \quad \text{Equation 7}$$

Subtracting Equation 7 from Equation 4 gives $$D_{AP1:C} - D_{AP2:C} + D_{AP1:AP2} + \quad \text{Equation 8}$$
$$(t_{CTX} - t_{AP1TX})\left(\frac{f_{CLK1} - f_{CLK2}}{f_{nom}}\right) + D_{AP1:C}\left(\frac{f_{CLK1} - f_{nom}}{f_{nom}}\right) +$$
$$(D_{AP1:AP2} - D_{AP2:C})\left(\frac{f_{CLK2} - f_{nom}}{f_{nom}}\right).$$

which consists of the desired result ($D_{AP1:C} - D_{AP2:C}$) plus several error terms given by $$\text{Error} = D_{AP1:AP2} + \quad \text{Equation 9}$$
$$(t_{CTX} - t_{AP1TX})\left(\frac{f_{CLK1} - f_{CLK2}}{f_{nom}}\right) + D_{AP1:C}\left(\frac{f_{CLK1} - f_{nom}}{f_{nom}}\right) +$$
$$(D_{AP1:AP2} - D_{AP2:C})\left(\frac{f_{CLK2} - f_{nom}}{f_{nom}}\right)$$

The first error term ($D_{AP1:AP2}$) can be determined in one of two ways. The first method is to estimate it from the known AP (102, 104) positions according to $$D_{AP1:AP2} = \quad \text{Equation 10}$$
$$\frac{\sqrt{(X_{AP1} - X_{AP2})^2 + (Y_{AP1} - Y_{AP2})^2 + (Z_{AP1} - Z_{AP2})^2}}{c}$$

where ($X_{AP1}$, $Y_{AP1}$, $Z_{AP1}$) are the Cartesian coordinates of AP1 102, ($X_{AP2}$, $Y_{AP2}$, $Z_{AP2}$) are the Cartesian coordinates of AP2 104, and c is the speed of light in free space. One disadvantage of this approach is that the propagation delay could actually be larger than that predicted by Equation 10 due to multipath. A more accurate method is described in US Patent Application Publication No. 2004/0203877, which measures the actual propagation delay. Subtracting $D_{AP1:AP2}$ from Equation 9 leaves us with an overall error of $$\text{Error} = \quad \text{Equation 11}$$
$$(t_{CTX} - t_{AP1TX})\left(\frac{f_{CLK1} - f_{CLK2}}{f_{nom}}\right) + D_{AP1:C}\left(\frac{f_{CLK1} - f_{nom}}{f_{nom}}\right) +$$
$$(D_{AP1:AP2} - D_{AP2:C})\left(\frac{f_{CLK2} - f_{nom}}{f_{nom}}\right)$$

For a typical WLAN system where the maximum distance between radios is on the order of 1000 feet and the clock errors are confined to no more than 20 parts per million (PPM), the error term associated with $$D_{AP1:C}\left(\frac{f_{CLK1} - f_{nom}}{f_{nom}}\right) + (D_{AP1:AP2} - D_{AP2:C})\left(\frac{f_{CLK2} - f_{nom}}{f_{nom}}\right) \quad \text{Equation 12}$$

should be less than 0.1 nS. The error term associated with $$(t_{CTX} - t_{AP1TX})\left(\frac{f_{CLK1} - f_{CLK2}}{f_{nom}}\right), \quad \text{Equation 13}$$

however, would be 4 nS for $t_{C\ TX} - t_{AP1\ TX} = 100\ \mu S$ (typical for DSSS/CCK operation) if the two clocks have frequency differences of 40 PPM ($f_{CLK1\ Err} = +20$ PPM and $f_{CLK2\ Err} = -20$ PPM).

To avoid the error term given by Equation 13, the relative frequency difference between AP1 102 and AP2 104 can be computed. This is typically done as part of the demodulation process when a packet is received. Thus, AP2 104 computes the relative frequency difference between $f_{CLK1}$ and $f_{CLK2}$ when it receives the packet from AP1 102. Assume the relative frequency estimate is given by $$\frac{f_{CLK1}}{f_{CLK2}} + \frac{f_{Err}}{f_{nom}} \quad \text{Equation 14}$$

where $f_{Err}$ denotes the frequency estimation error term. Multiplying Equation 7 and Equation 14 gives $$(t_{CTX} D_{AP2:C} - t_{AP1TX} - D_{AP1:AP2}) \quad \text{Equation 15}$$
$$\left(1 + \frac{f_{CLK1} - f_{nom}}{f_{nom}} + \frac{f_{Err} f_{CLK2}}{f_{nom}^2}\right).$$

Subtracting Equation 15 from Equation 4 gives $$D_{AP1:C} - D_{AP2:C} + D_{AP1:AP2} + \quad \text{Equation 16}$$
$$(D_{AP1:C} - D_{AP2:C} + D_{AP1:AP2})\left(\frac{f_{CLK1} - f_{nom}}{f_{nom}}\right) -$$
$$(t_{CTX} + D_{AP2:C} - t_{AP1TX} - D_{AP1:AP2})\left(\frac{f_{Err} f_{CLK2}}{f_{nom}^2}\right).$$

The error term is now given by $$\text{Error} = \quad \text{Equation 17}$$
$$D_{AP1:AP2} + (D_{AP1:C} - D_{AP2:C} + D_{AP1:AP2})\left(\frac{f_{CLK1} - f_{nom}}{f_{nom}}\right) -$$
$$(t_{CTX} + D_{AP2:C} - t_{AP1TX} - D_{AP1:AP2})\left(\frac{f_{Err}f_{CLK2}}{f_{nom}^2}\right).$$

As previously discussed, $D_{AP1:AP2}$ can either be estimated or measured. The error term given by $$(D_{AP1:C} - D_{AP2:C} + D_{AP1:AP2})\left(\frac{f_{CLK1} - f_{nom}}{f_{nom}}\right) \quad \text{Equation 18}$$

should be less than 0.1 nS similar to the error term of Equation 12. The frequency estimation error is typically limited to several kilohertz and the error term associated with $$(t_{CTX} + D_{AP2:C} - t_{AP1TX} - D_{AP1:AP2})\left(\frac{f_{Err}f_{CLK2}}{f_{nom}^2}\right) \quad \text{Equation 19}$$

is several orders of magnitude less than the error term associated with Equation 13.

Figure 4:
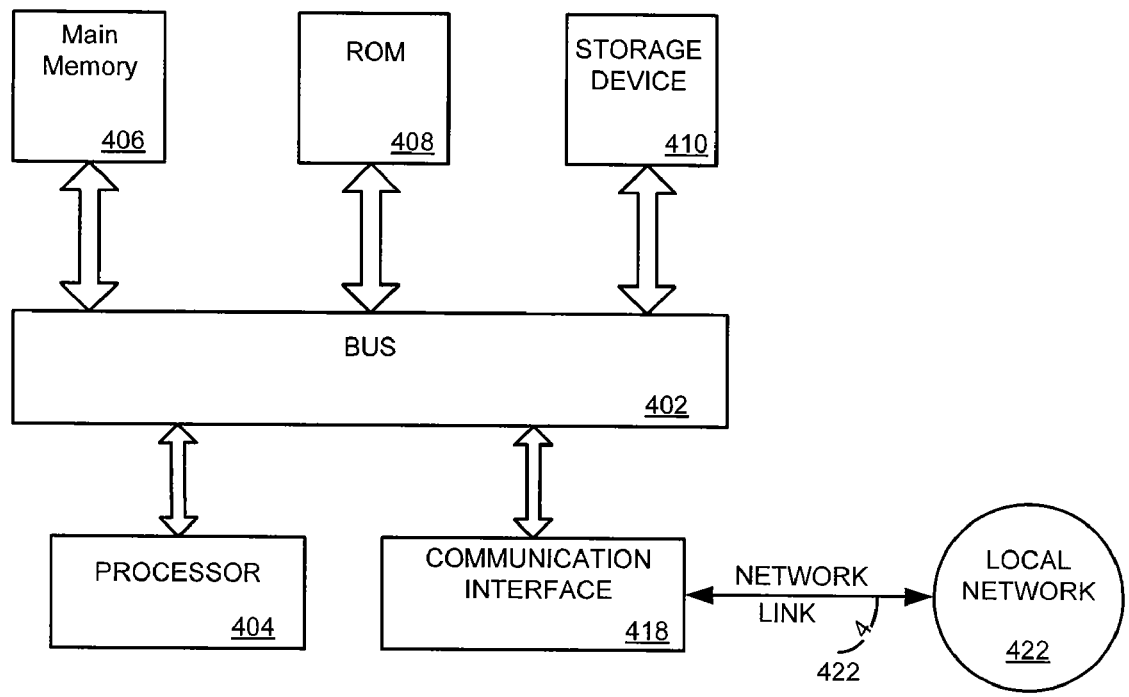
FIG. 4 is a block diagram of a computer system for implementing an aspect of the present invention.

FIG. 4 is a block diagram that illustrates a computer system 400 upon which an embodiment of the invention may be implemented. Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

The invention is related to the use of computer system 400 for performing TDOA location without requiring a common time base or clock calibration. According to one embodiment of the invention, performing TDOA location without requiring a common time base or clock calibration is provided by computer system 400 in response to processor 404 executing one or more sequences of one or more instructions contained in main memory 406. Such instructions may be read into main memory 406 from another computer-readable medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to non-volatile media, volatile media, and transmission media. Non-volatile media include for example optical or magnetic disks, such as storage device 410. Volatile media include dynamic memory such as main memory 406. Transmission media include coaxial cables, copper wire and fiber optics, including the wires that comprise bus 402. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, a carrier wave as described hereinafter, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a link to other access points (e.g. AP1 102, AP2 104 and/or AP3 106). As another example, computer system 400 can be used to implement TDOA Logic 116 in FIG. 1. Computer system 400 can obtain data from AP1 102, AP2, 104 and/or AP3 106 to perform TDOA calculations for client 118 through communication interface 418.

Figure 5:
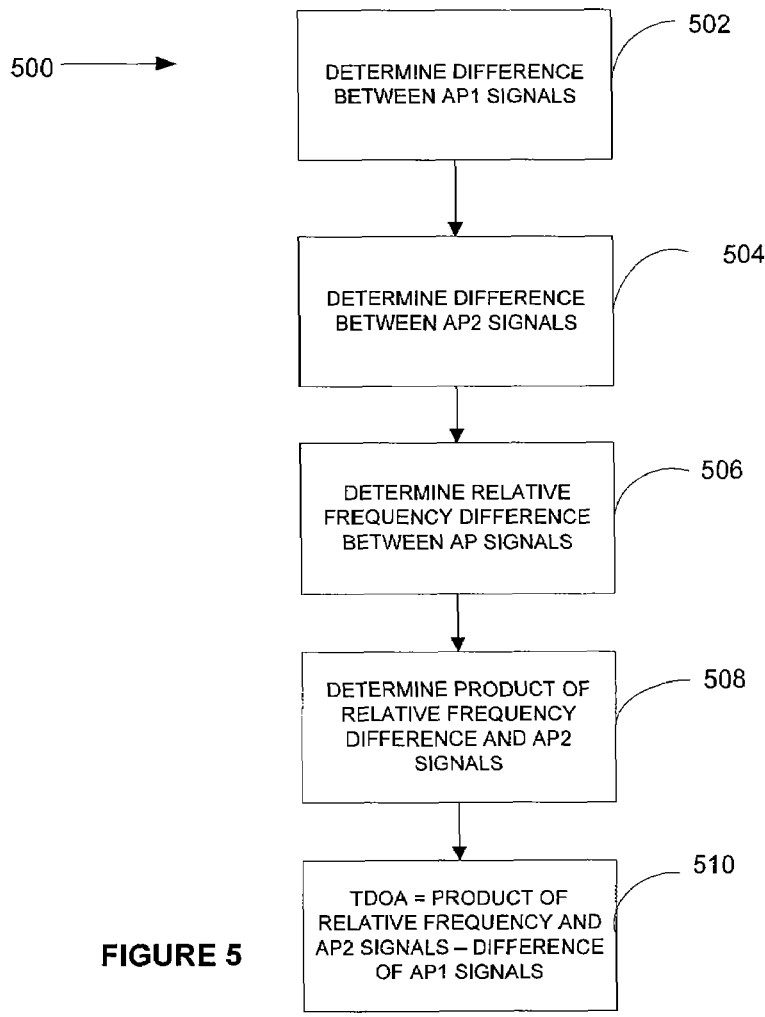
FIG. 5 is a block diagram of a methodology in accordance with an aspect of the present invention.
Figure 6:
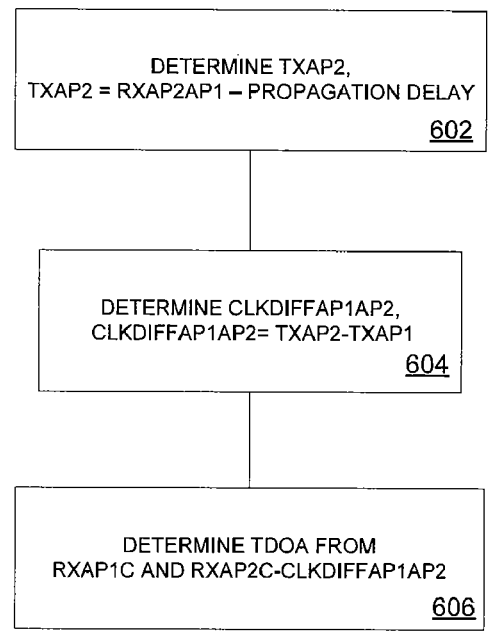
FIG. 6 is a block diagram of a methodology in accordance with an aspect of the present invention.

In view of the foregoing structural and functional features described above, methodologies in accordance with various aspects of the present invention will be better appreciated with reference to FIGS. 5 and 6. While, for purposes of simplicity of explanation, the methodologies of FIGS. 5 and 6 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof.

Referring to FIG. 5, there is illustrated a methodology 500 in accordance with an aspect of the present invention. The description for methodology 500 will also refer to network 100 of FIG. 1 and timing diagram 200 of FIG. 2 for ease of illustration. It should be readily appreciated by one skilled in the art that aspects of methodology 500 are adaptable to any suitable wireless network and can be used to determine TDOA between signals received by more than two wireless devices. The description given herein refers to two devices for receiving a signal from client 118 for ease of illustration and should not be construed as limited to two devices.

Referring to FIG. 2, AP1 transmits a signal (AP1 TX) at $t_{AP1\ TX}$. Client transmits a signal (Client TX) at $t_{C\ TX}$. AP1 receives the cleint signal at $T_{CTX+DAP1:C}$, where DAP1:C is the propagation delay from the client to AP1. AP2 receives the signal AP1 TX at $t_{AP1\ TX+DAP1:AP2}$, where DAP1:AP2 is the known propagation delay between AP1 and AP2. AP2 receives the client signal Client TX at $t_{C\ TX+DAP2:C}$, where DAP2:C is the propagation delay between the client and AP2.

At 502, a first difference is computed. The first difference is the difference of signals perceived by AP1 102 (FIG. 2). The difference is between when AP1 102 receives the client packet and when the packet was transmitted by AP 1 102 ($t_{C\ TX+D_{AP1:C}}^{CLK1} - t_{AP1\ TX}^{CLK1}$ FIG. 2).

At 504, a second difference is computed. The second difference is derived from the time estimate from when the packet was received from AP1 102 ($t_{AP1\ TX+D_{AP1:AP2}}^{CLK2}$ FIG. 2) which is subtracted from the time when the client packet was received ($t_{CTX+D_{AP2:C}}^{CLK2}$ FIG. 2).

At 506, the relative frequency difference between the clocks of AP1 102 and AP2 104 are computed. AP2 104 computes the relative frequency difference between $f_{CLK1}$ and $f_{CLK2}$ when it receives the packet from AP1 102, which can be estimated by Equation 14 described herein supra:

$$\frac{f_{CLK1}}{f_{CLK2}} + \frac{f_{Err}}{f_{nom}}.$$

At 508, a product is computed between the relative frequency difference (determined at 506) and the signals received by AP2 104 (determined at 504). At 510, the TDOA is calculated by the difference of signals for AP1 102 (determined at 502) is subtracted from the product determined at 508. It should be noted that method 500 does not depend on the order that the signals were received (e.g. whether the AP1 102 transmits first or client 118 transmits first). Methodology 500 assumes the propagation delay between AP1 102 and AP2 104 is known. The propagation delay can be a predetermined delay (e.g. measured previously) or can be dynamically calculated by an exchange of signals between AP1 102 and AP2 104. The estimated error for methodology 500 is determined using Equation 17 described herein supra.

Referring now to FIG. 6 there is illustrated a methodology 600 in accordance with an aspect of the present invention. As with methodology 500, methodology 600 assumes the propagation delay between AP1 102 and AP2 104 is known. Methodology 600 performs calculations based on two signals, wherein the propagation delay for one of the signals is known.

A signal is transmitted by AP1 at TXAP1 and received by AP2 at RXAP2AP1. Another signal is transmitted by the client and received by AP1 at RXAP1C and by AP2 at RXAP2C.

When AP2 receives a signal from AP1, it can determine a transmit time relative to the clock for AP2. This is illustrated in step 602 where TX AP2 is calculated by subtracting the known propagation delay from RXAP2AP1. TX AP2 is used to calibrate the clock differences between AP1 and AP2. As shown at 604, CLKDIFFAP1AP2 (the time adjustment factor) is given by TXAP2−TXAP1. At 606, the TDOA is computed after adjusting RXAP2C. The TDOA algorithm uses RXAP1C and RXAP2C−CLKDIFFAP1AP2. In an alternate embodiment, the TDOA algorithm at 602 can use RXAP1C adjusted by the time difference factor and RXAP2C.

As with methodology 500 in FIG. 5, the order in which the signals from AP1 and the client are received is unimportant. The propagation delay between AP1, AP2 can be a predetermined fixed delay (e.g. a measured delay) or can be determined dynamically, such as by exchanging signals between AP1, AP2 to determine the propagation delay.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A method, comprising:
   receiving data from a first wireless device representative of a time the first wireless device transmitted a first signal and a time the first wireless device received a second signal from a third wireless device based on a first clock associated with the first wireless device;
   receiving data from a second wireless device representative of a time the second wireless device received the first signal and the time the second wireless device received the second signal based on a second clock associated with the second wireless device;
   calculating a first time difference, the first time difference being the difference between the time the first wireless device received the second signal and the time the first wireless device transmitted the first signal;
   calculating a second time difference, the second time difference being the difference between the time second wireless device received the second signal and the time the second wireless device received the first signal;
   calculating a relative frequency difference between the first clock and the second clock;
   adjusting the second time difference by multiplying the second time difference by the relative frequency difference; and
   determining a time difference of arrival for the second signal based on a difference between the first time difference and the adjusted second time difference.

2. The method set forth in claim 1, wherein the first wireless device is an access point and the second wireless device is an access point.

3. The method set forth in claim 2, further comprising determining a propagation delay between the first access point and the access point.

4. The method set forth in claim 3, wherein the propagation delay is a measured delay.

5. The method set forth in claim 3, wherein the propagation delay is determined dynamically.

6. The method set forth in claim 5, wherein determining the propagation delay further comprises exchanging signals between the first wireless device and the second wireless device.

7. The method set forth in claim 2, wherein the second signal is transmitted before the first signal.

8. The method set forth in claim 1, further comprising determining a propagation delay between the first wireless device and the second wireless device.

9. The method set forth in claim 8, wherein the propagation delay is a measured delay.

10. The method set forth in claim 9, wherein the propagation delay is determined dynamically.

11. The method set forth in claim 10, wherein determining the propagation delay further comprises exchanging signals between the first wireless device and the second wireless device.

12. The method set forth in claim 1, wherein the second signal is transmitted before the first signal.

13. An apparatus, comprising:
means for receiving data from a first wireless device representative of a time the first wireless device transmitted a first signal and a time the first wireless device received a second signal from a third wireless device based on a first clock associated with the first wireless device;
means for receiving data from a second wireless device representative of a time the second wireless device received the first signal and the time the second wireless device received the second signal based on a second clock associated with the second wireless device;
means for calculating a first time difference, the first time difference being the difference between the time the first wireless device received the second signal and the time the first wireless device transmitted the first signal;
means for calculating a second time difference, the second time difference being the difference between the time second wireless device received the second signal and the time the second wireless device received the first signal;
means for calculating a relative frequency difference between the first clock and the second clock;
means for adjusting the second time difference by multiplying the second time difference by the relative frequency difference; and
means for determining a time difference of arrival for the second signal based on a difference between the first time difference and the adjusted second time difference.

14. The apparatus of claim 13, wherein the first wireless device is an access point and the second wireless device is an access point.

15. The apparatus of claim 13, wherein the first signal is transmitted before the second signal.

16. The apparatus of claim 13, further comprising means for determining a propagation delay between the first wireless device and the second wireless device.

17. The apparatus of claim 16, wherein the means for determining a propagation delay further comprises means for measuring the propagation delay.

18. The apparatus of claim 16, wherein the means for determining a propagation delay further comprises mean for determining the propagation delay dynamically.

19. A method, comprising:
receiving a first signal from a first wireless device by a second wireless device at a first time according to a clock at the second wireless device;
calculating a computed transmit time for the first signal, calculating the computed transmit time comprises subtracting a known propagation delay between the first wireless device and the second wireless device;
obtaining a second transmit time for the first signal, the second transmit time corresponding to a transmit time according to a clock in the first wireless device;
determining a time adjustment factor to calibrate a clock difference between the first wireless device and the second wireless device, the determining a time adjustment factor comprises subtracting the computed transmit time from the second transmit time;
determining a first received time for a second signal, the first received time for the second signal is a time that the second signal sent by a third wireless device was received by the first wireless device;
determining a second received time for the second signal, the second received time for the second signal is a time that the second signal is received by the second wireless device;
calculating an adjusted second received time for the second signal, the adjusted second received time for the second signal is determined by subtracting the time adjustment factor from the second time; and
determining a time difference of arrival for the second signal, the time difference of arrival is the difference between the first received time for the second signal and the adjusted second received time for the second signal.

* * * * *